United States Patent
Burrows et al.

(10) Patent No.: US 7,277,887 B1
(45) Date of Patent: Oct. 2, 2007

(54) HIGH-SPEED TERM AND PHRASE MATCHING VIA SUCCESSIVE COMPLEXITY REDUCTION

(75) Inventors: Steven A. Burrows, Lake Oswego, OR (US); John P. Elliott, Wilsonville, OR (US)

(73) Assignee: News Technologies, LLC, Lake Oswego, OR (US)

( * ) Notice: Subject to any disclaimer, the term of this patent is extended or adjusted under 35 U.S.C. 154(b) by 563 days.

(21) Appl. No.: 10/321,127

(22) Filed: Dec. 16, 2002

Related U.S. Application Data (60) Provisional application No. 60/384,616, filed on May 29, 2002, provisional application No. 60/382,071, filed on May 20, 2002.

(51) Int. Cl.
*G06F 7/00* (2006.01)
*G06F 17/00* (2006.01)
(52) U.S. Cl. .............................. 707/6; 707/7
(58) Field of Classification Search ................ 707/1–7, 707/10, 100, 102, 104.1, 200; 704/200, 231, 704/251; 705/1, 26, 35, 37; 715/500, 530, 715/531, 533, 700, 751
See application file for complete search history.

(56) References Cited

U.S. PATENT DOCUMENTS

| | | | |
|---|---|---|---|
| 6,260,050 B1* | 7/2001 | Yost et al. ................ 715/501.1 |
| 6,377,949 B1* | 4/2002 | Gilmour ....................... 707/10 |
| 6,505,196 B2* | 1/2003 | Drucker et al. ................. 707/5 |
| 6,587,835 B1* | 7/2003 | Treyz et al. ................... 705/26 |
| 6,745,161 B1* | 6/2004 | Arnold et al. ................... 704/7 |
| 6,766,328 B2* | 7/2004 | Stefanchik et al. ......... 707/101 |
| 6,839,686 B1* | 1/2005 | Galant .......................... 705/35 |
| 6,925,605 B2* | 8/2005 | Bates et al. ................. 715/745 |
| 2002/0095362 A1* | 7/2002 | Masand et al. ............... 705/35 |
| 2002/0152151 A1* | 10/2002 | Baughman et al. ........... 705/36 |

OTHER PUBLICATIONS

Faensen et al., A unified model of internet scale alerting services. In L. C. K. Hui and D. L. Lee, editors, Internet Applications, 5th International Computer Science Conference ICSC'99, vol. 1749 of LNCS, pp. 284-293, 1999.*

Gauch et al., Journal of Universal Computer Science, 2(9), 1996, pages.*

* cited by examiner

*Primary Examiner*—Cheyne D Ly
(74) *Attorney, Agent, or Firm*—Schwabe Williamson & Wyatt (57) ABSTRACT

A composite match criteria list having one or more match criteria is created. The composite match criteria list is from a plurality of user match criteria lists of a plurality of users, each having a plurality of user match criteria. A message is received. It is determined whether the first message comprises one or more terms that match one or more user match criteria of one or more users, based at least in part on the composite match criteria list.

43 Claims, 12 Drawing Sheets

| Match term or phrase 1110 | Company Name 1120 | Company Symbol 1130 | Buy Price 1140 | # Shares 1150 | Profit Limit (%) 1160 | Loss Limit (%) 1170 | Time Limit 1180 |
|---|---|---|---|---|---|---|---|
| Stock Split | <ANY> | <ANY> 1125 | MKT | 1000 | 5 | 3 | 4H 30M |
| exceeds expectations | <ANY> | <ANY> | NTE 40.00 | 500 | 10 | 5 | 30M |
| FDA approval | BioGen | BGEN 1144 | MKT 1142 | 500 | 40 1165 | 10 1175 | CLOSE- 10M 1185 |

"*User10* Transaction Criteria List"

Figure 11

Figure 12

HIGH-SPEED TERM AND PHRASE MATCHING VIA SUCCESSIVE COMPLEXITY REDUCTION

CROSS REFERENCE TO RELATED APPLICATIONS

This application claims priority to U.S. Provisional Application No. 60/382,071, titled "High-Speed Token And Phrase Matching Via Successive Complexity Reduction", filed on May 20, 2002, and U.S. Provisional Application No. 60/384,616, titled "Automatic Securities Program Trading Using Tokens Or Match Phrases", filed on May 29, 2002 which are both hereby fully incorporated by reference.

BACKGROUND OF THE INVENTION

1. Field of the Invention

The invention relates to the field of information processing. More specifically this invention relates to the field of disseminating electronic information via a computer network.

2. Background Information

Networking advances have brought about significant improvements in the way information is communicated. As recently as the 1990s information was transmitted to users routinely via phone calls, scheduled news broadcasts or a postal service. This made the process of real time decision making difficult due to a lack of confidence in the currency of information. Indeed frequently, the only people with a reasonably complete picture on a situation were those people with dedicated, usually expensive, resources for the collection of real time data.

The modern commercial development of the global communications network referred to as the Internet has dramatically changed the availability of information. Today users can obtain news information by using a computer to access news sites via the Internet and specifically via the World Wide Web. This allows users to obtain information when the user wishes to obtain information vis-à-vis obtaining information at predetermined times. Notwithstanding this increase in information availability, several issues still remained. Specifically the ability of a user to obtain data in a timely matter and the ability to distinguish relevant information from the vast quantity of information available via the Internet and the World Wide Web are both significant challenges.

Various information sources offer an ability to push information to a user. A typical example of this is the provision of information via a stream of data. Specifically, real time stock pricing information is available whereby a user may obtain real time stock pricing for purposes of determining an action to be taken on a particular stock of interest. While this is plausible for the specific example of monitoring a specific data source for a specific security of interest, this method of operation for working with large volumes of information available from multiple data sources is untenable.

Consequently an efficient method of dealing with the vast quantities of information available via today's information networks is required.

DETAILED DESCRIPTION OF THE PREFERRED EMBODIMENTS

Processes for matching sources of information with user match criteria are advantageously decomposed into stages such that more compute-intensive operations are performed on reduced data sets. In addition, the news information is received and, by utilizing user match criteria, automated securities transactions are advantageously performed. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
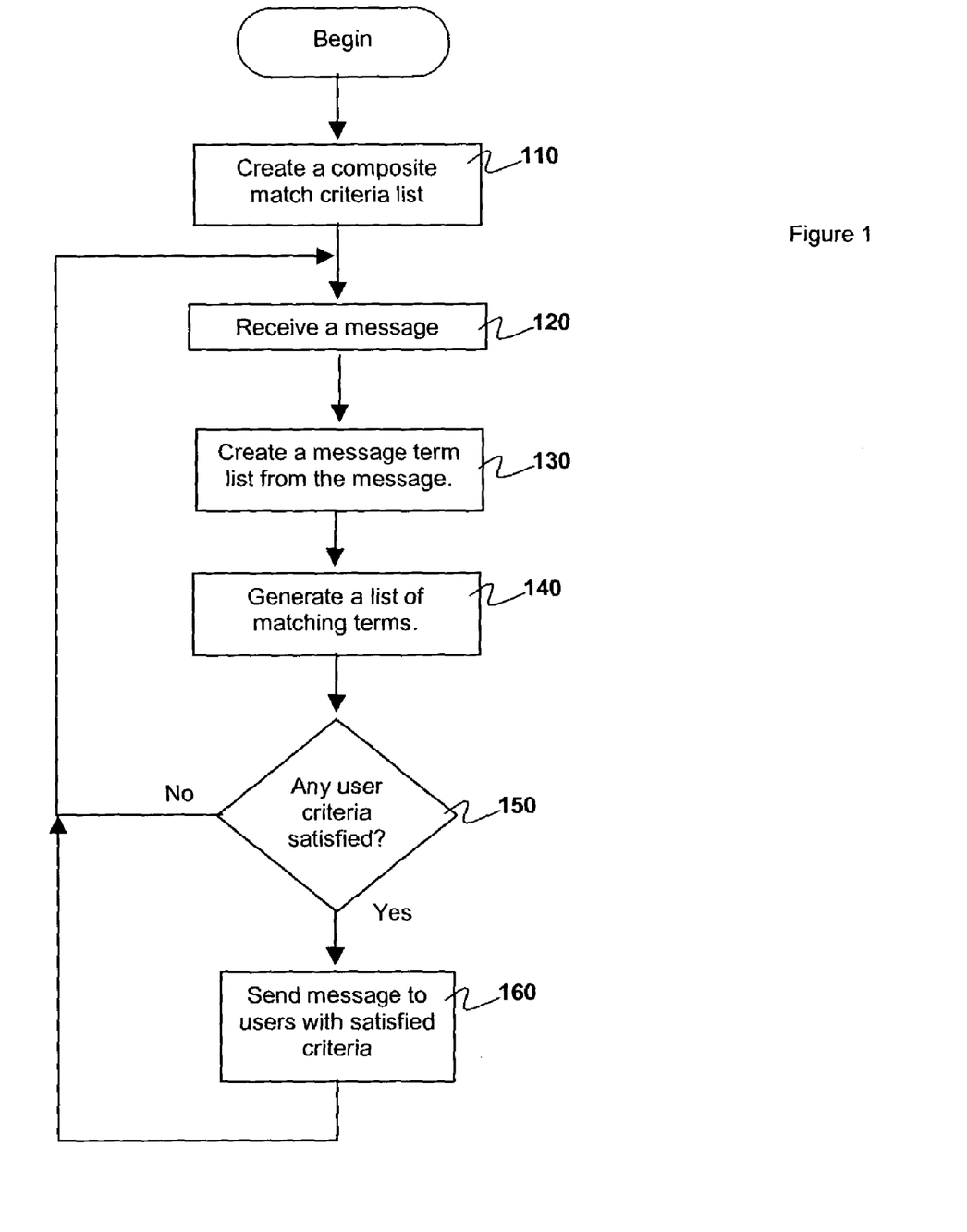
FIG. 1 illustrates an operational flow of a server with a matching engine, in accordance with one embodiment.

FIG. 1 illustrates an operational flow of a server with a matching engine, in accordance with one embodiment. A composite match criteria list is created 110. As described in further detail below, this composite match criteria list is comprised of match criteria from a number of users. Upon creating a composite match criteria list, the server begins processing messages from an informational source. After receiving a message 120, the server generates a message term list from the message 130. For example, in the case where a message is a header for a news story, the header is divided into terms. Each term is a word of the header. A set of matching terms can be created from the composite list and the message term list 140. From this list of matching terms, a determination can be made as to whether any of the user criteria are satisfied 150. If there are user criteria which are satisfied, the message is sent to users corresponding to the matching criteria.

Figure 2:
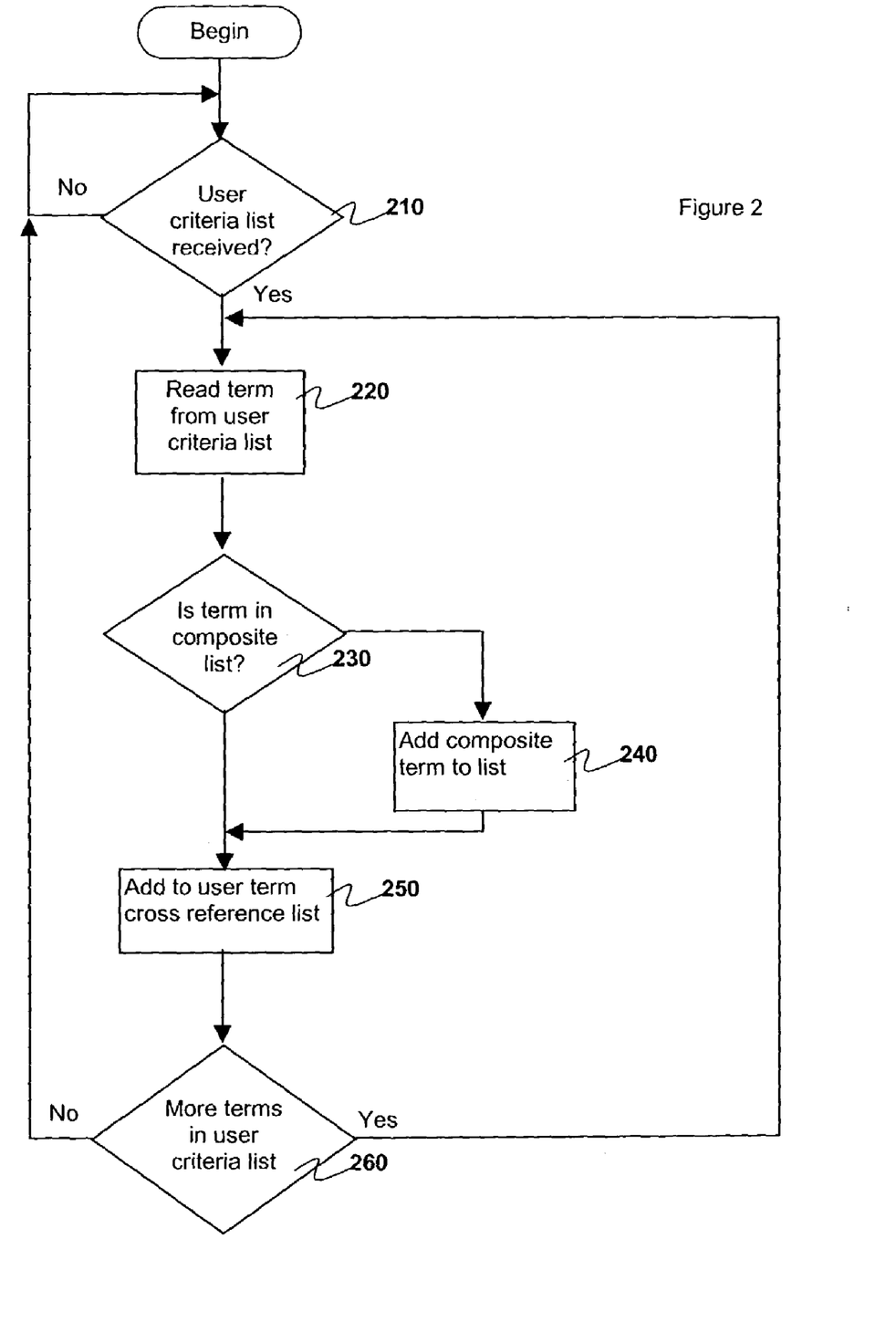
FIG. 2 illustrates the steps in the generation of a composite user list, in accordance with one embodiment.

FIG. 2 illustrates the steps in the generation of a composite user list, in accordance with one embodiment. An agent waits for a user criteria list to be received from a user 210. The agent then reads a term from the user criteria list 220. The agent determines if the term is in a composite term list 230. If the term is not in the composite term list, the agent will add the term to the composite list of terms 240. If the term is in the composite term list, this addition to the composite term list is skipped. Next, the agent will add the term to a user's cross reference list 250 indicating that the term is to be associated with the user. The agent determines if there are more terms to be processed in this user's criteria list 260, if so, the agent processes these in the manner described above. If not, the agent waits for another user criteria list to be received for processing.

Figure 3:
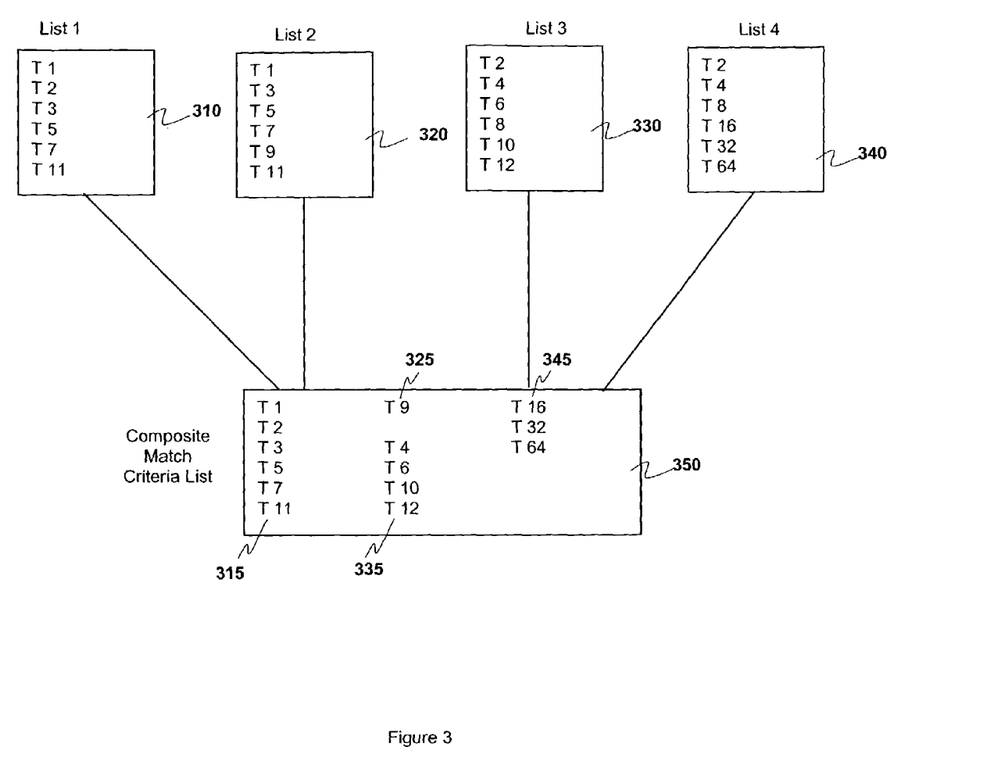
FIG. 3 illustrates a composite match criteria list generated from user criteria lists, in accordance with one embodiment.

FIG. 3 illustrates a composite match criteria list 350 generated from user criteria lists, in accordance with one embodiment. A server has processed four separate user match criteria lists 310-340 each containing a list of terms to be matched. Upon processing the first user match criteria list 310, none of the terms listed in the first user match criteria list 310 are present in the, initially empty, composite match criteria list 350. Thus, after processing the first user match criteria list 310, the composite match criteria list contains a first set of terms 315. The server then processes the second user match criteria list 320. During the processing of the second user match criteria list 320, the server advantageously determines that there is only one term 325 in the second user match criteria list 320 not already present in the composite match criteria list 350. Thus, only one term 325 is added to the composite match criteria list 350. Consequently, as the number of user match criteria lists increases, the number of terms in the composite match criteria list does not grow in the manner that it would otherwise. In the embodiment shown, two additional user match criteria list 330 340 are processed by the server. This results in the addition of several terms 335 345 to the composite match criteria list 350.

Figure 4:
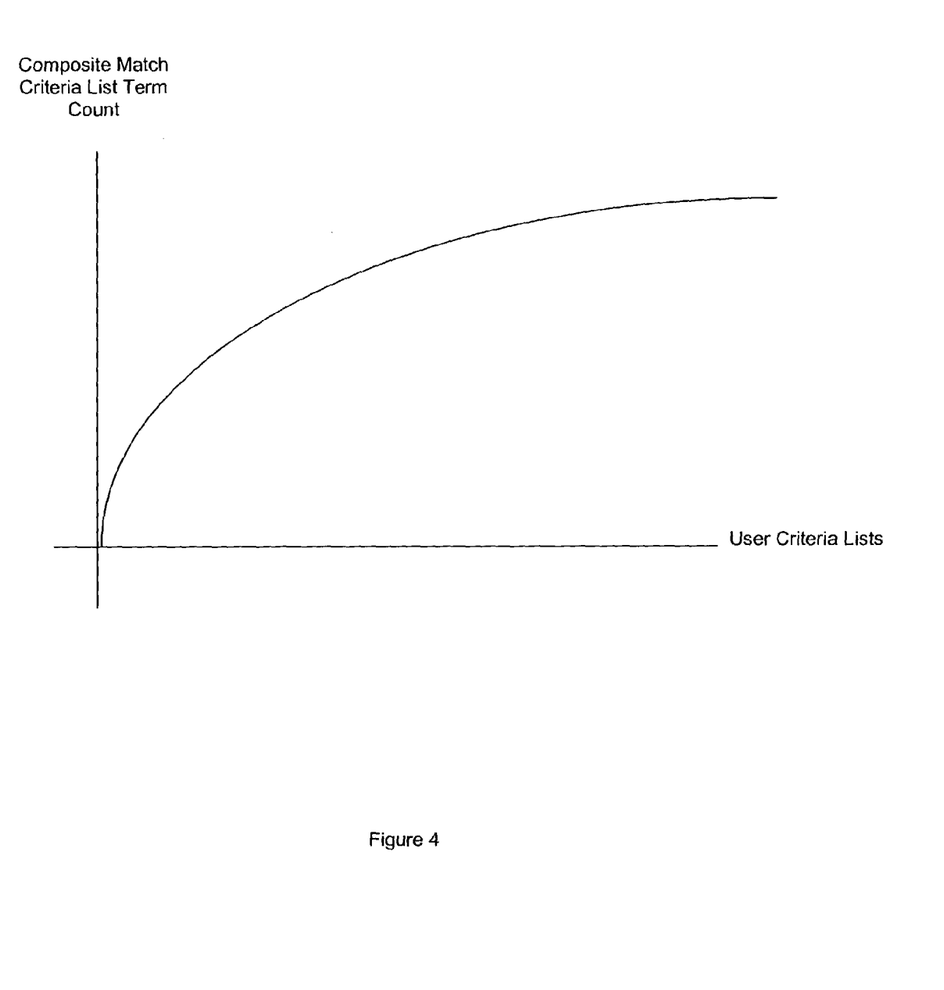
FIG. 4 illustrates the relationship between the composite number of user match criteria and the number of users utilizing a matching engine.

FIG. 4 illustrates the relationship between the composite number of user match criteria and the number of users utilizing a matching engine. As the number of users grows, due to redundancies in the terms that will be used by different users, the increase in the number of terms in the composite user match list does not grow linearly. A smaller composite match criteria list results in a decreased processing time for determination matching terms in a message. Consequently, this results in a decreased processing time of the determination of the satisfaction of any entries in a user match criteria list. Thus by reducing the set of terms to be searched, increased efficiency in the matching process occurs.

Figure 5:
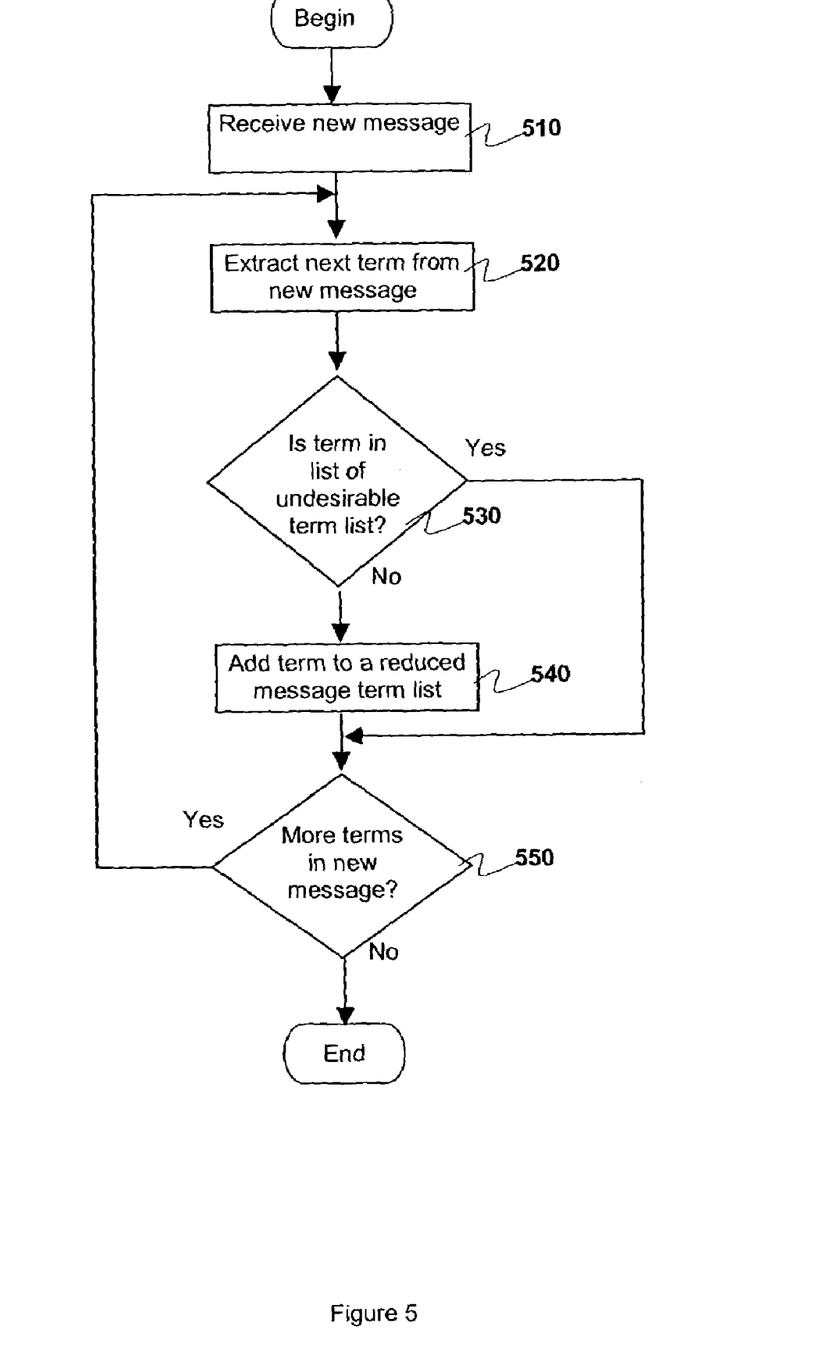
FIG. 5 shows a flow diagram illustrating the procedure for creating a message term list from a message, in accordance with one embodiment.

FIG. 5 shows a flow diagram illustrating the procedure for creating a message term list from a message, in accordance with one embodiment. A message processing routine receives a new message for processing 510. The message processing routine extracts a term from the new message for processing 520.

The message processing routine consults a list of undesirable terms for matching. In various embodiments, it is desirable to remove terms from matching consideration that are necessary to properly convey meaning to a reader, but do not necessarily contribute to the user match criteria. Such terms frequently include articles such as "an", "a" and "the". However, the list of undesirable terms may include other parts of speech in addition to articles. Thus, the message processing routine can employ discrete lists of undesirable terms. Alternatively, the message processing routine can apply "rules" to a message when processing the terms. For example, the rules may stipulate that the message processing routine is to remove all articles and pronouns from a message. By removing undesirable terms from the message term list, further complexity reduction is accomplished for the matching process.

Returning now to FIG. 5, regardless of the method of determination, a determination is made as to whether the currently processed term is an undesirable term 530. If the term is not undesirable, then it is added to the reduced message term list 540. A check is made to determine if there are additional terms in the message to process 550 and, if so, the process is repeated for each term.

Figure 6:
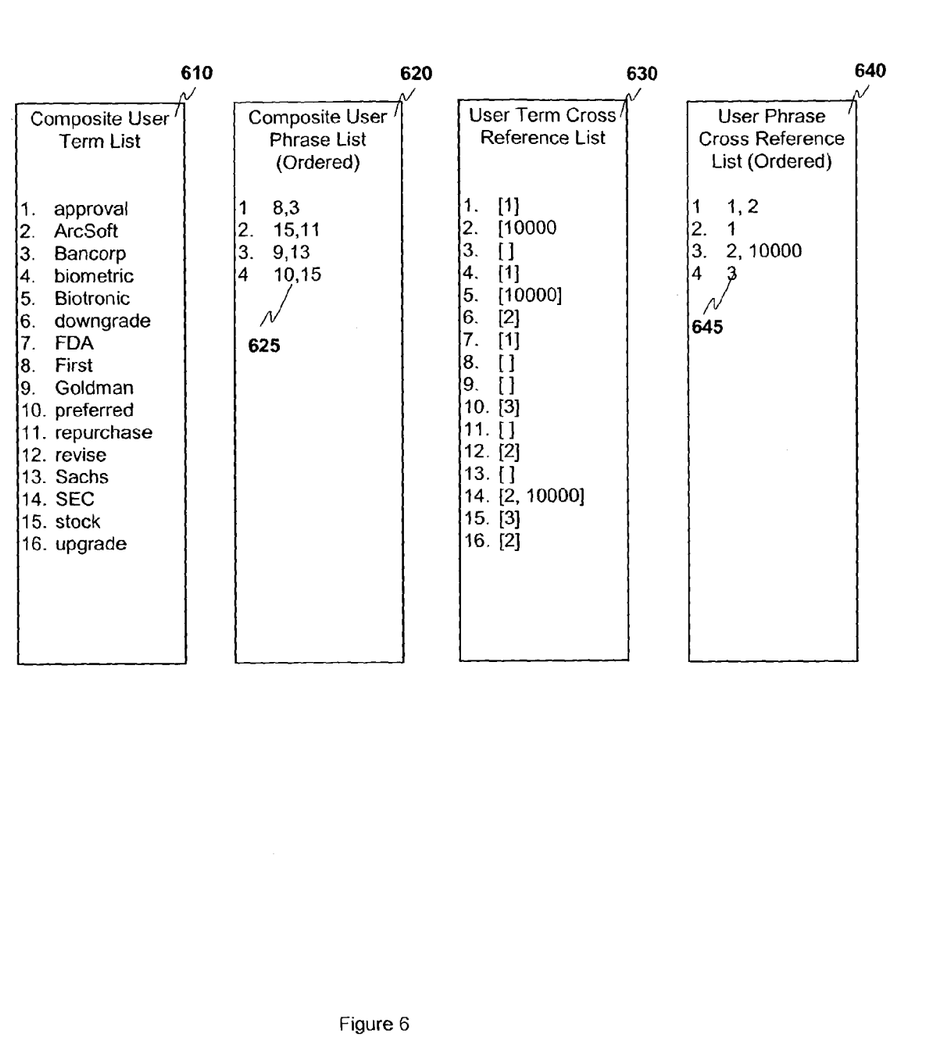
FIG. 6 shows lists maintained by a server illustrating phrase matching capability, in accordance with one embodiment.

FIG. 6 shows lists maintained by a server illustrating phrase matching capability, in accordance with one embodiment. Four lists are shown. The first list is the composite user term list 610. This list contains the reduced list of terms as previously discussed. The second list contains a composite ordered user phrase list 620. In this embodiment, the server contains support for handling ordered phrase lists of terms. Thus, when a user match criteria list is obtained, a composite ordered phrase list 620 is also created in addition to the composite user match criteria list, as previously described.

FIG. 6 also illustrates the generation of cross reference listings. As part of the generation of user term and user phrase lists, user term cross reference 630 and user phrase cross reference 640 lists are generated. When a composite user term list is created, a user term cross reference list is also created to identify associations between terms and users. This facilitates the determination of which user is to be sent a message when a match occurs between the composite user term list and the message term list. A similar list is created for phrases as illustrated.

For example, assume that the phrase "preferred stock" occurs in a user criteria list for a user with a userid of 3. In addition, assume that a message containing the phrase "preferred stock" is processed. A matching engine can use the composite user phrase list 620 to determine that the phrase "preferred stock" is to be matched 625. The matching engine can then use the user phrase cross reference list 640 to determine that user 3 545 is the user to whom the phrase match occurred.

In another embodiment, support for having terms that are not allowed to be in the phrase as well as the ability to perform proximity searching is also present. In yet another embodiment, industry specific term and phrase lists are created and distributed with a system. In this case, a user has the ability to specify that all or a portion of a given industries default criteria are to be included in the user criteria list.

Figure 7:
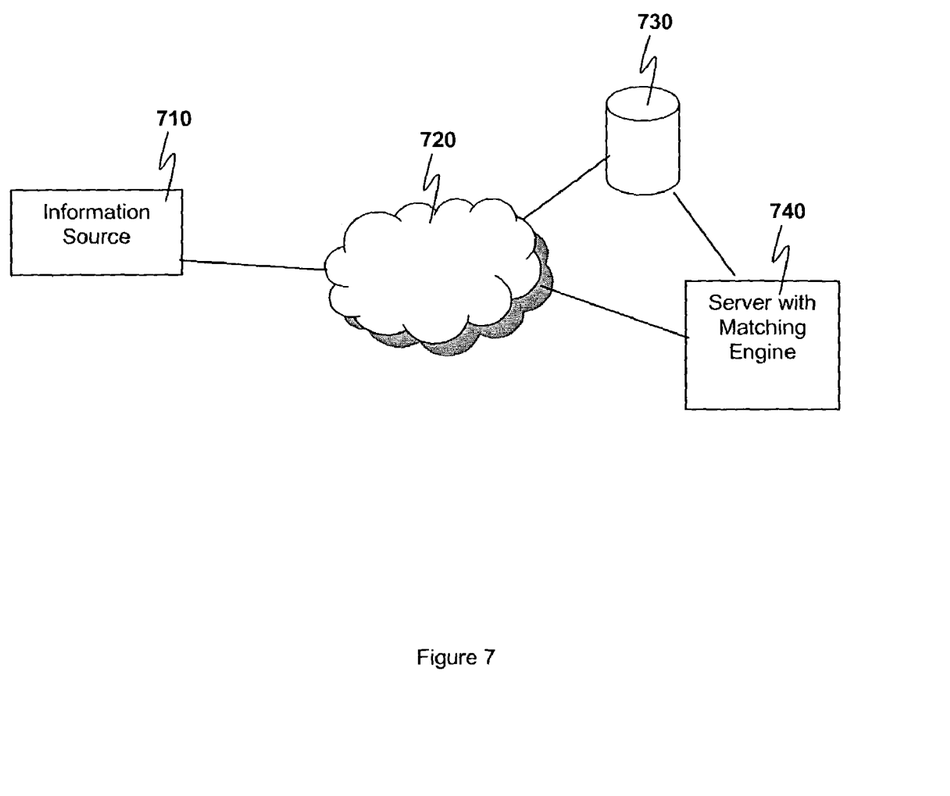
FIG. 7 illustrates an information source providing information to a server containing a matching engine, in accordance with one embodiment.

FIG. 7 illustrates an information source 710 providing information to a server containing a matching engine 740, in accordance with one embodiment. An information source 710 that provides real-time information is connected to a client 740 via a network 720. Information source 710 can be any provider of information. For example, in one embodiment, the information source can be a real-time news provider such as Reuters News Service. The information source is provided an address on the network 720 for transferring information to a node containing a storage location 730. In this manner, the information source 710 does not need to be dependant upon the processing speed of the server with the matching engine 740. For example, information source 710 is provided with an address of a node containing a storage location 730 which supporting communications via the File Transfer Protocol (FTP). Information source 710 feeds information to the FTP node asynchronously to the server with matching engine 740. The server with matching engine 740 can then process the information as it is able to do so. By having an optimized term and phrase matching routine, as disclosed herein, a server with matching engine 740 is better able to timely serve the information as it is received.

Figure 8:
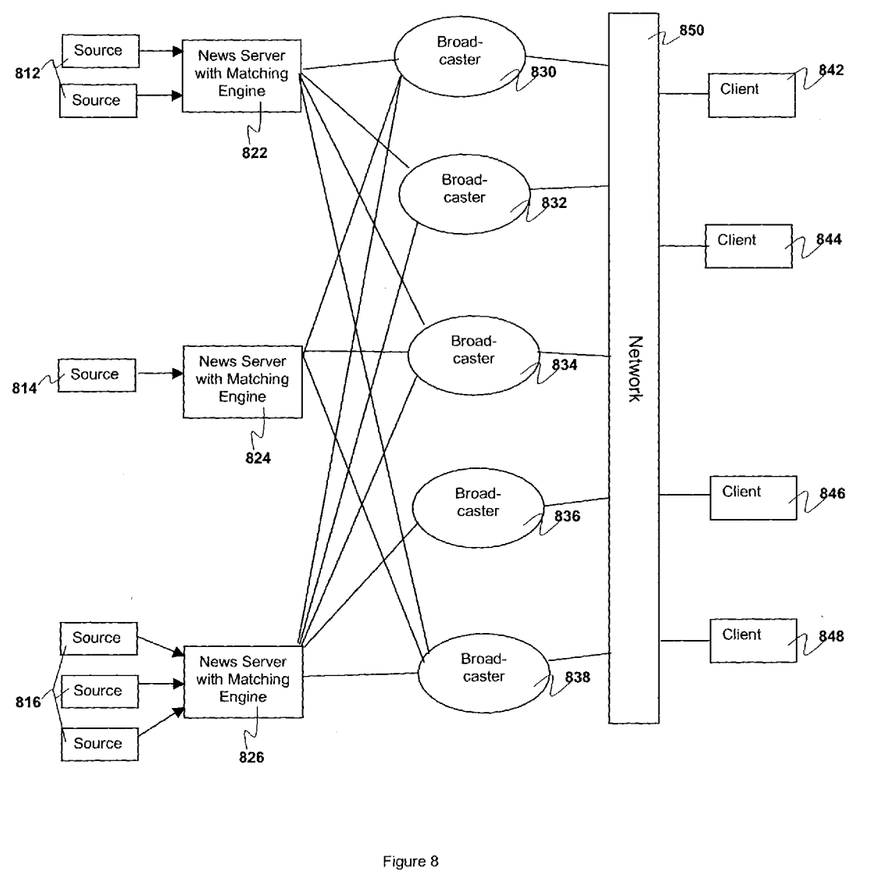
FIG. 8 illustrates a system compatible with the disclosed term and phrase matching methodology.

FIG. 8 illustrates a system compatible with the disclosed term and phrase matching methodology. Sources of news 812-816 provide information to a number of news servers containing matching engines 822-824. In this embodiment, the news servers with matching engine 822-824 have a direct, dedicated feed from the sources 812-816 to minimize the delay in receiving the news information that would otherwise occur as a result of network slow downs. In the embodiment shown, information is shown as being pushed to the servers. In other embodiments, as discussed subsequently, information is actively obtained by a scanner accompanying a matching engine. The news servers with matching engine 812-816 process the information to determine if there is a match to user criteria. If there is a user criteria which is matched, a cross reference is made to the news server's databases to determine the proper user and the corresponding destination client 842 848 for that user. Upon determination of the corresponding destination client 842 848, a proper broadcaster 830 832 is ascertained. The new servers with matching engines 822-824 then forward the message to the appropriate clients 842-848 through one or more broadcasters 830-838. In one embodiment, the broadcaster contains queue managers. The queue managers provides the ability to store messages for clients to retrieve at a later time if the client is offline when an initial attempt to deliver a message occurs.

The information that is received by the client 842-848 can then be provided to the user in any number of manners. Due to the advantageous processing of information in a time efficient fashion by the disclosed matching engine, provision of the matched information to a client in a timely manner is also possible. Thus in one embodiment, a pop-up window is utilized to alert the user to the presence of information from the matching engine. In addition, the use of the matching information to perform automatic actions wherein the timely performance of such actions, as subsequently described, is a benefit of the disclosed methodology.

Figure 9:
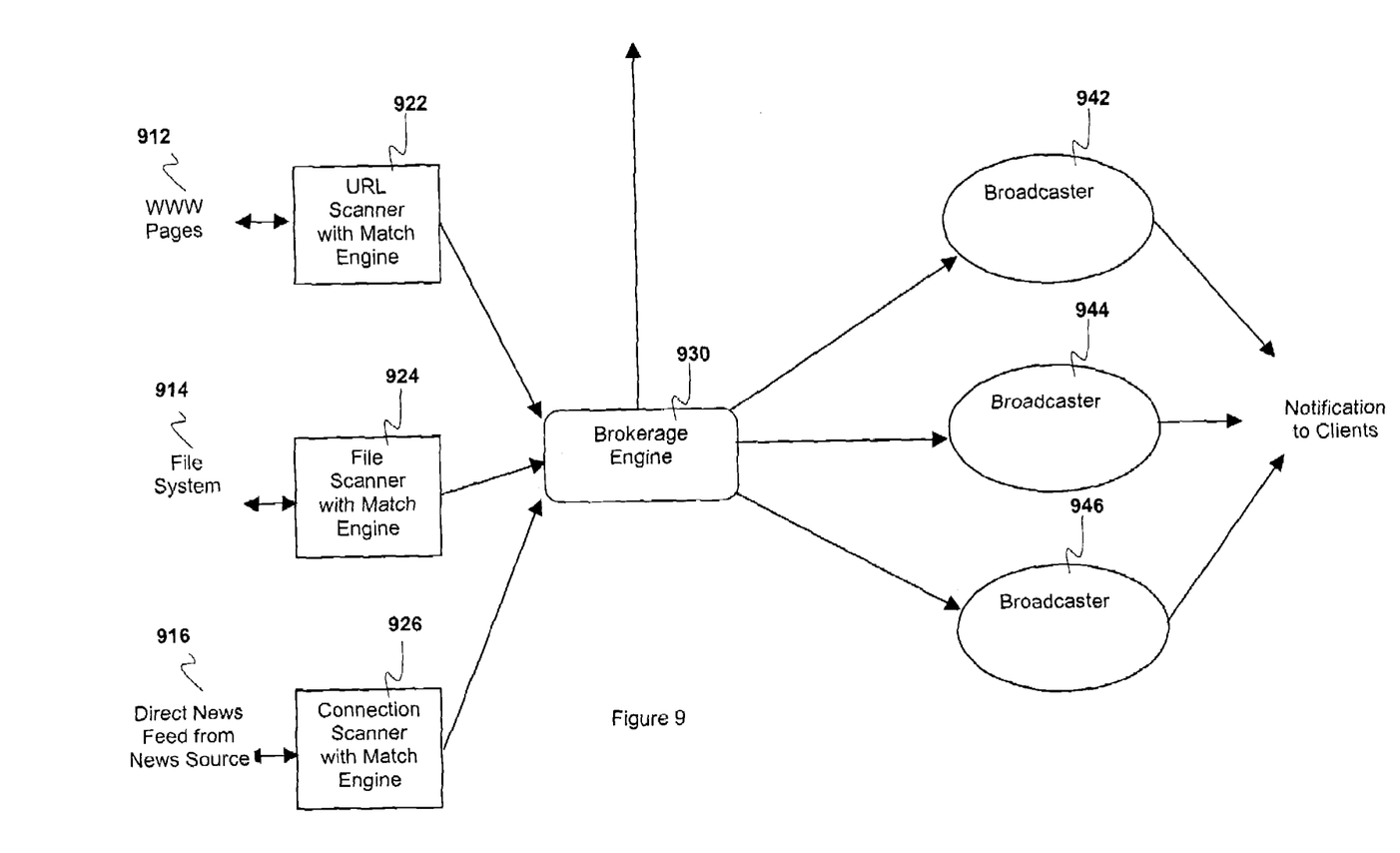
FIG. 9 illustrates a system utilizing scanners and match engines along with a brokerage engine to perform automatic securities trading, in accordance with one embodiment.

FIG. 9 illustrates a system utilizing scanners and match engines 922-926 along with a brokerage engine 930 to perform automatic securities trading, in accordance with one embodiment. In this embodiment, the scanners are source type specific. For example, one scanner with its matching engine 922 contains a Uniform Resource Locator (URL) scanner. This URL scanner looks at pages from the World Wide Web 912 and checks for changes in links. When a change occurs, this changed page is processed by the matching engine. In this embodiment, a second scanner with its matching engine 924 scans a file system 914. The information on the file system is "pushed" there from a news source (not shown) as previously discussed in connection with FIG. 7. Also illustrated is a third scanner with matching engine 926. This scanner with matching engine 926 receives a direct feed from news source 916. Other possibilities (not shown) include the ability of a matching engine to have more than one scanner. For example, a single matching engine can have one scanner for scanning a file system 914 and a second scanner for receiving a direct feed from a news source 916.

Figure 10:
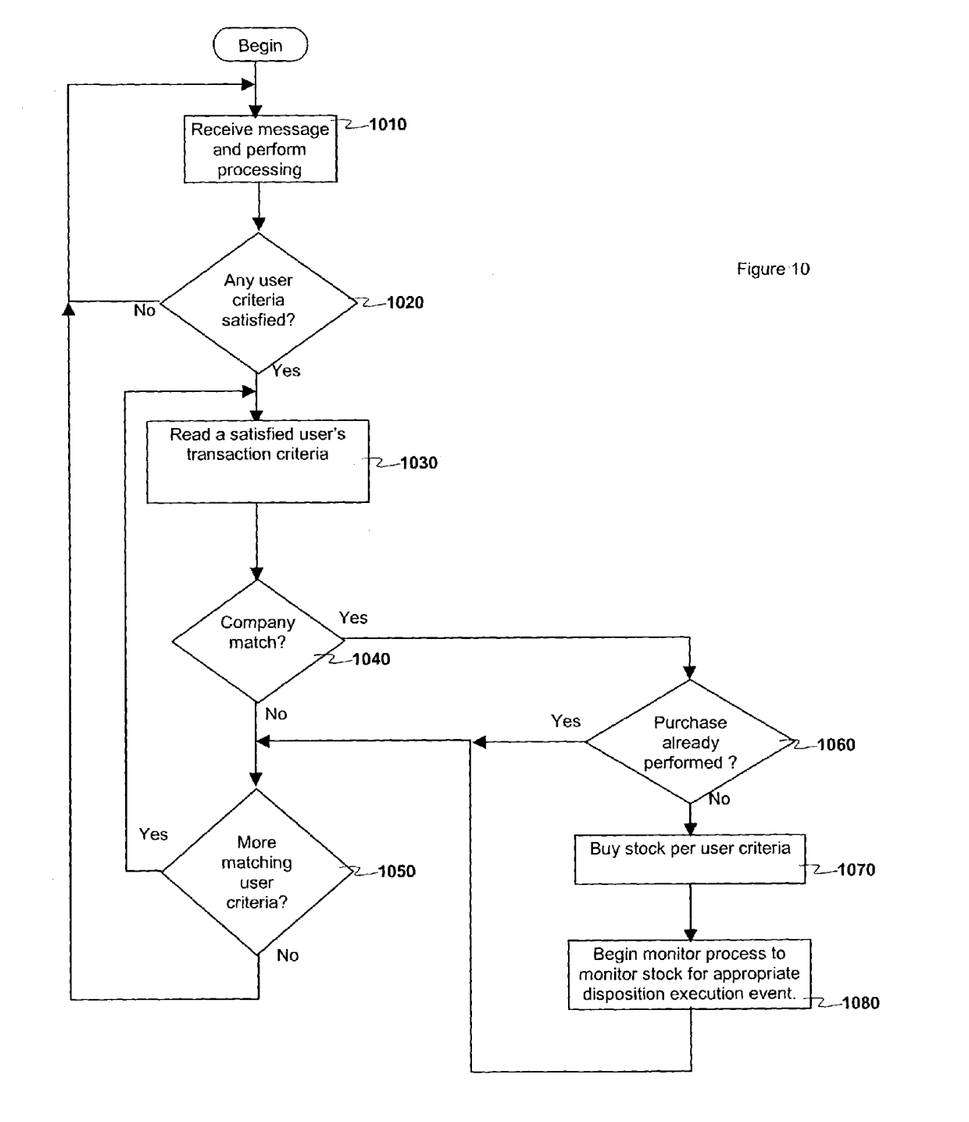
FIG. 10 illustrates a flow diagram for a match engine and brokerage engine, in accordance with one embodiment.

Information 912-914 is obtained by the scanners with match engines 922 924. The scanners with match engines 922 924 determine if criteria have been satisfied for the purchase of securities. If so, a brokerage engine 930 is utilized to perform securities purchase and monitoring. FIG. 10 illustrates a flow diagram for a match engine 922 924 and brokerage engine 930, in accordance with one embodiment. A scanner 924 receives a message and the matching engine processes the message 1010. For example, in one embodiment, the processing includes removing undesired matching terms and determining if a user match criteria for terms and/or phrases are satisfied. If there are no user criteria satisfied by the matching terms 1020 then the scanner 924 will obtain another message for processing 1010. If there is a satisfied user criteria, a corresponding transaction criteria list is read 1030 and checked 1040 to see if there is a company match between the satisfied match criteria and those in the transaction criteria list. If there is a match, then the user's transaction criteria are checked to determine if a stock sale is to be performed based on this message.

Figure 11:
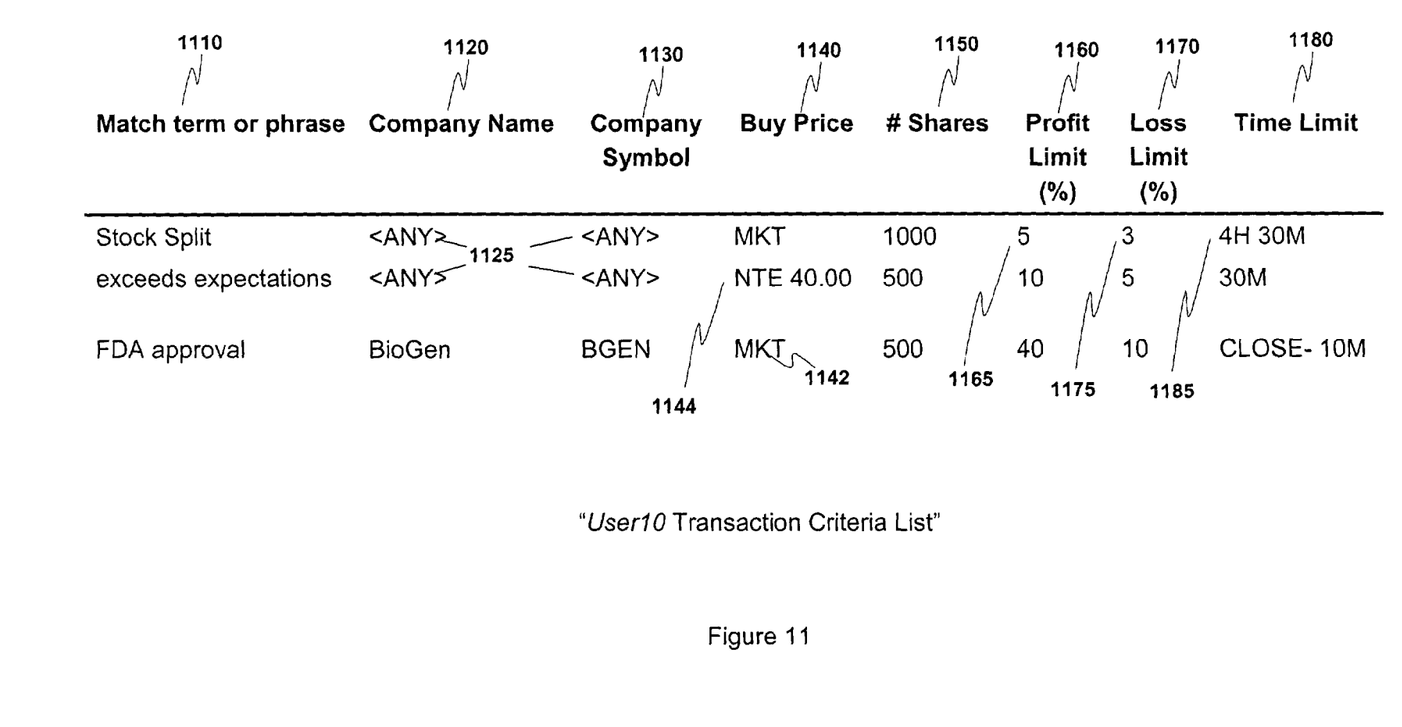
FIG. 11 illustrates a user transaction criteria list compatible with the embodiment illustrated in FIGS. 9 and 10.

FIG. 11 illustrates a user transaction criteria list compatible with the embodiment illustrated in FIGS. 9 and 10. The rows in the table illustrate separate transaction criteria for a user, in this case user10. The first column illustrates the various user match criteria against which a message is checked 1110. The following two columns 1120 1130 in the table indicate the security to which the criteria apply. In the case of the first two rows, the corresponding user match criteria apply to any company. The fourth column specifies the price at which the securities are to be purchased 1140. For example, in the third row, the securities are to be purchased at market value 1142. In the second row, however, a not-to-exceed amount 1144 is placed on the price at which the securities can be purchased. The fifth column specifies the number of shares to be transacted 1150. The remaining columns specify when the securities should be sold. The sixth column specifies the upper percentage limit on the stock price at which the security should be sold 1160. For example, in the first row's transaction criteria, the stock should be sold if it increases in value by 5% from the purchase price 1165. The seventh column specifies the percentage loss limit on the stock price at which the security should be sold 1170. For example, in the first row's transaction criteria, the stock should be sold if it decreases in value by 3% from the purchase price 1175. Such a limit can be used to minimize losses in the cases where the market does not react as expected to the news. The final column indicates a time at which the stock should be sold, if the two previously mentioned conditions have not been met 1180. For example, in the first row's transaction criteria, the stock should be sold after 4 hours and 30 minutes if it has not increased by 5% or decreased by 3% from the time it was purchased 1185. These set of transaction criteria for the processing of the securities is exemplary and not intended to limit in any manner. Others types of investment exercises such as options purchases and sales as well as shorts sales are possible.

For illustration, assume a news message obtained via URL scanner 912 containing the phrase "XYZ Corporation Announces Stock Split" is received and processed by a scanner with a matching engine 922. This scanner with matching engine 922 contains a composite user criteria list (not shown) containing, among other criteria from other users, the match criteria 1110 of user10. Thus, this composite user criteria list will include terms "stock" and "split". Moreover, the phrase "stock split" is noted and associated with user10. In addition to the term and phrase matching criteria, the scanner contains the transaction criteria for user10 as illustrated in FIG. 11. In the embodiment shown, upon receipt and processing of the message "XYZ Corporation Announces Stock Split", a resulting match of the "stock split" phrase occurs. Upon determination that user10's match criteria 1110 have been satisfied, user10's transaction criteria are checked. As shown in FIG. 11, when a match is made to the phrase "stock split", a corresponding company name match is checked. As shown, any company name 1120 or company stock symbol 1130 listed as part of the message containing "stock split" will match 1040.

After a company match is determined, a check is made to determine if a previous purchase of shares of stock has occurred as a result of the same news information, but from a different message 1060. If so, a purchase does not occur. If, however, no purchase has been made based on this information, 1000 shares of XYZ corporation are purchased at market price 1070. After the purchase is performed, a monitor process will be started for tracking the 1000 purchased shares 1080. The scanner will then determine if there are more users with matching criteria 1050 and, if there are, process those users' match criteria as discussed. If not, the scanner will process another message.

Figure 12:
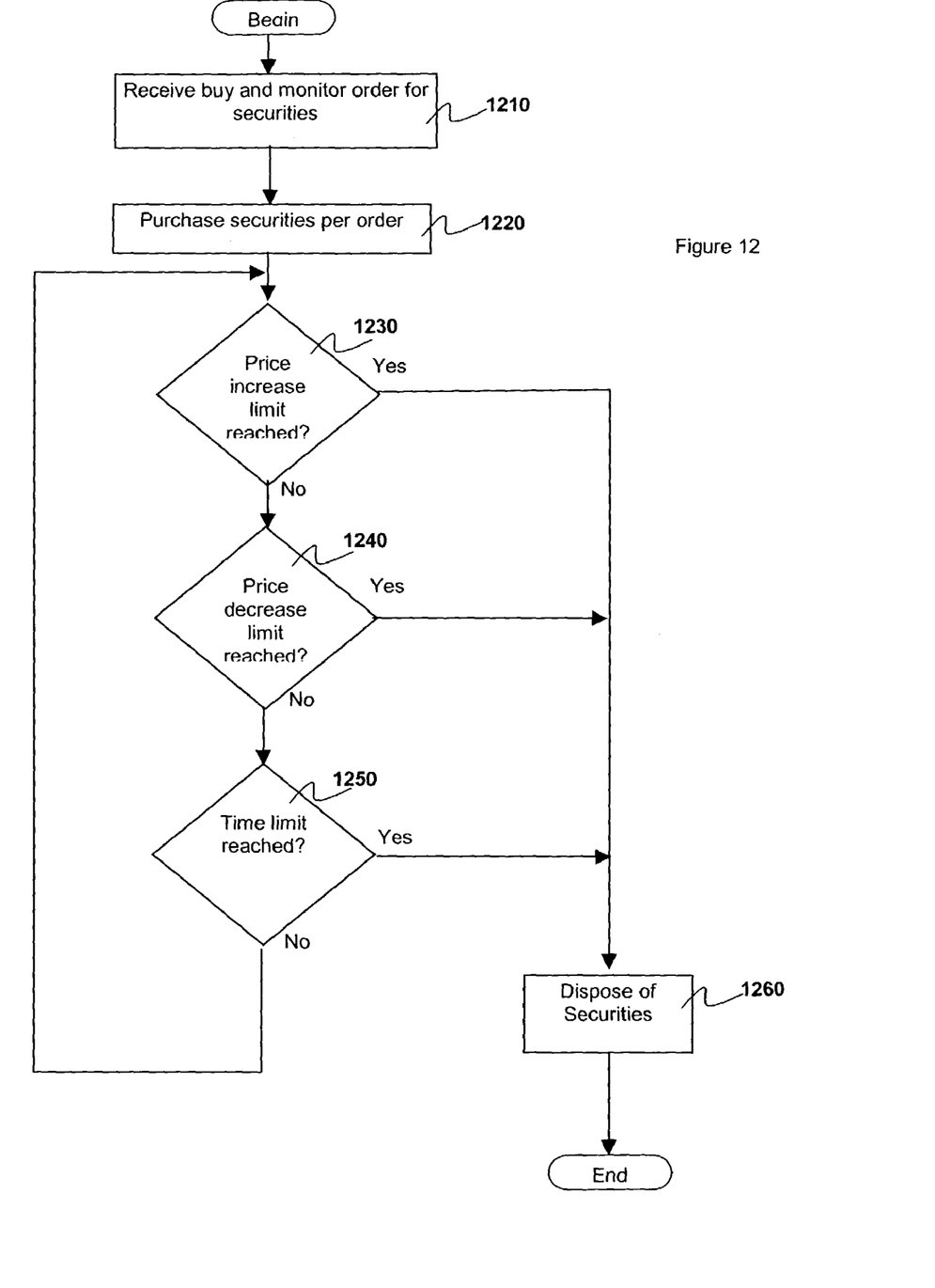
FIG. 12 illustrates a purchase and monitoring process in accordance with one embodiment.

FIG. 12 illustrates a purchase and monitoring process in accordance with one embodiment. Once a determination is made by a matching engine that a securities purchase is to be made, a process for purchasing and monitoring the securities is established. The process receives a buy order and a set of monitor criteria for the noted securities 1210. The process purchases the securities as indicated in the buy order 1220. The process then monitors the current price of the stock in addition to the elapsed time since the securities were purchased. If the stock price rises by a predetermined amount 1230, the process sells the securities 1260. Similarly, if a loss amount is specified, then the if the stock price drops by the loss amount 1240, the process sells the securities 1260 to minimize the loss. Finally, if a time limit is specified 1250, and the other criteria 1230 1240 have not yet been satisfied, the process sells the securities 1260.

Thus, a method of performing optimized matching operations on reduced matching data sets has been described. While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A method for providing an indicia to a group of users within a plurality of users comprising:
   receiving by a matching engine a plurality of user criteria lists from the plurality of users;
   creating by the matching engine a composite match criteria list corresponding to one of the plurality of user criteria lists;
   comparing by the matching engine another user criteria list to the composite match criteria list;
   identifying by the matching engine one or more user criteria corresponding to the another user criteria list as one or more match criteria, wherein the one or more match criteria is not already present in the composite match criteria list;
   adding by the matching engine the identified one or more match criteria to the composite match criteria list;
   receiving by the matching engine a first message, wherein said first message comprising one or more terms;
   comparing by the matching engine the one or more terms to the composite match criteria list; and
   providing by the matching engine an indicia to a group of users within the plurality of users, wherein each user criteria list of each user in the group comprising at least one user criteria corresponding to the match criteria in the composite criteria list, and further wherein the at least one user criteria matches at least one of the one or more terms of the first message.

2. The method of claim 1 further comprising
   creating a message term list from the first message having a plurality of message terms; and
   generating a list of matching terms, wherein each matching term matches a term in the composite match criteria list and a term in the message term list.

3. The method of claim 2 wherein said generating a list of matching terms includes matching combinations of one or more message terms.

4. The method of claim 3 wherein the matching combinations of one or more message terms is order dependant.

5. The method of claim 2 further comprising:
   determining which, if any, of the one or more user match criteria of the plurality of user match criteria lists are satisfied using the list of matching terms.

6. The method of claim 2 wherein at least one of the match criteria of the composite match criteria list, the message terms in the message term list, and the matching terms of the matching term list is tokenized.

7. The method of claim 1 wherein the method further comprises generating a reduced version of the first message, and said determining is further performed using the reduced version of the first message.

8. The method of claim 7 wherein said generating of the reduced version of the first message comprises removing one or more predetermined number of terms from the first message if the predetermined terms are present in the first message.

9. The method of claim 8 wherein said one or more predetermined number of terms comprise one or more undesirable terms.

10. The method of claim 1 wherein said providing comprises providing the indicia corresponding to the first message to a first user of the plurality of users determined to have at least one user match criteria on a respective user match criteria list that matches at least one of the one or more terms of the first message via a pop-up window.

11. The method of claim 1 wherein the indicia comprises the first message.

12. The method of claim 2 wherein the method further comprises taking an action based at least in part on said indicia.

13. The method of claim 12 wherein said taking of an action comprises trading securities for a user upon determination that one or more of the plurality of user match criteria of the user are satisfied by the list of matching terms.

14. The method of claim 12 wherein trading securities comprises purchasing securities associated with a company whose name is present in the first message and in the match criteria of the user.

15. The method of claim 14 further comprising scheduling an automatic disposition of the purchased securities.

16. The method of claim 15 wherein the scheduling an automatic disposition of the purchased securities is performed within parameters of a user.

17. The method of claim 14 wherein the first message is associated with a first event and wherein the trading securities further depends upon determining whether a prior trading of securities has occurred based on the first event.

18. The method of claim 1 wherein a term is a selected one of a word, a number or a stock symbol.

19. The method of claim 1 wherein the first message comprises a message header.

20. The method of claim 1 wherein the first message is a news story.

21. An apparatus for providing an indicia to a group of users within a plurality of users comprising:
    at least one storage unit having stored thereon programming instructions designed to
    receive by a matching engine a plurality of user criteria lists from the plurality of users;
    create by the matching engine a composite match criteria list corresponding to one of the plurality of user criteria lists;
    compare by the matching engine another user criteria list to the composite match criteria list;
    identify by the matching engine one or more user criteria corresponding to the another user criteria list as one or more match criteria, wherein the one or more match criteria is not already present in the composite match criteria list;
    add by the matching engine the identified one or more match criteria to the composite match criteria list;
    receive by the matching engine a first message, wherein said first message comprising one or more terms;
    compare by the matching engine the one or more terms to the composite match criteria list;
    provide by the matching engine an indicia to a group of users within the plurality of users, wherein each user criteria list of each user in the group comprising at least one user criteria corresponding to the match criteria in the composite criteria list, and further wherein the at least one user criteria matches at least one of the one or more terms of the first message; and
    at least one processor coupled to said at least one storage unit to execute said programming instructions.

22. The apparatus of claim 21 further comprising:
    creating a message term list from the first message having a plurality of message terms; and
    generating a list of matching terms, wherein each matching term matches a term in the composite match criteria list and a term in the message term list.

23. The apparatus of claim 22 wherein said generating a list of matching terms includes matching combinations of one or more message terms.

24. The apparatus of claim 23 wherein said matching combinations of one or more message terms is order dependant.

25. The apparatus of claim 22 further comprising
    determining which, if any, of the one or more user match criteria of the plurality of user match criteria lists are satisfied using the list of matching terms.

26. The apparatus of claim 22 wherein at least one of the match criteria of the composite match criteria list, the message terms in the message term list, and the matching terms of the matching term list is tokenized.

27. The apparatus of claim 21 wherein the programming instructions are further designed to generate a reduced version of the first message, and said determining is further performed using the reduced version of the first message.

28. The apparatus of claim 27 wherein said generating of the reduced version of the first message comprises removing one or more predetermined number of terms from the first message if the predetermined terms are present in the first message.

29. The apparatus of claim 28 wherein said one or more predetermined number of terms comprise one or more undesirable terms.

30. The apparatus of claim 21 wherein said providing comprises providing the indicia of the receipt of the first message to a first user of the plurality of users determined to have at least one user match criteria on a respective user match criteria list that matches at least one of the one or more terms of the first message via a pop-up window.

31. The apparatus of claim 21 wherein the indicia of the receipt of the first message comprises the first message.

32. The apparatus of claim 24 wherein the programming instructions are further designed to take an action based on said indicia.

33. The apparatus of claim 32 wherein said taking of an action comprises trading securities for a user upon determination that one or more of the plurality of user match criteria of the user are satisfied by the list of matching terms.

34. The apparatus of claim 33 wherein trading securities comprises purchasing securities associated with a company whose name is present in the first message and in the match criteria of the user.

35. The apparatus of claim 34 wherein the programming instructions are further designed to schedule an automatic disposition of the purchased securities.

36. The apparatus of claim 35 wherein the scheduling an automatic disposition of the purchased securities is performed within parameters of a user.

37. The apparatus of claim 32 wherein the first message is associated with a first event and wherein the trading securities further depends upon determining whether a prior trading of securities has occurred based on the first event.

38. The apparatus of claim 21 wherein a term is a selected one of a word, a number or a stock symbol.

39. The apparatus of claim 21 wherein the first message comprises a message header.

40. The apparatus of claim 21 wherein the first message is a news story.

41. The method of claim 1, further comprising:
    scanning a uniform resource locator (URL) source, a file source, and/or a connection source; and
    providing the first message to the matching engine based at least in part on said scanning.

42. The method of claim 1, further comprising:
    creating a user term cross references list correlating each of the one or more match criteria of the composite match criteria list to at least one user of the plurality of users; and
    providing the indicia to each user of the plurality of users determined to have at least one user match criteria on a respective user match criteria list that matches at least one of the one or more terms of the first message based at least in part on the user term cross references list.

43. The method of claim 1, further comprising:
    providing, to each of the plurality of users, an industry specific term and/or phrase list to facilitate generation of a respective user match criteria list.

* * * * *

UNITED STATES PATENT AND TRADEMARK OFFICE
CERTIFICATE OF CORRECTION

PATENT NO. : 7,277,887 B1 Page 1 of 1
APPLICATION NO. : 10/321127
DATED : October 2, 2007
INVENTOR(S) : Steven A. Burrows et al.

It is certified that error appears in the above-identified patent and that said Letters Patent is hereby corrected as shown below:

In the Drawings:

Figure 9 [Missing text, end of arrow at Block 930] should read --"Trade requests to brokerage server"--;

In the Claims:

Col. 8, line 14 and Col. 9, line 57 "…further comprising"…" should read --…further comprising:…--

Signed and Sealed this

Tenth Day of March, 2009

JOHN DOLL
*Acting Director of the United States Patent and Trademark Office*